United States Patent
Perlo et al.

(10) Patent No.: US 6,388,566 B1
(45) Date of Patent: May 14, 2002

(54) INFRARED SENSOR DEVICE FOR MOTOR-VEHICLES, ADAPTED FOR DETECTING PRESENCE OF AN OVERTAKING VEHICLE

(75) Inventors: Piero Perlo, Sommariva Bosco; Piermario Repetto, Turin; Vito Lambertini, Giaveno, all of (IT)

(73) Assignee: C.R.F. Societa Consortile Per Azioni, Turin (IT)

( * ) Notice: Subject to any disclaimer, the term of this patent is extended or adjusted under 35 U.S.C. 154(b) by 32 days.

(21) Appl. No.: 09/680,474

(22) Filed: Oct. 6, 2000

(30) Foreign Application Priority Data

Oct. 6, 1999 (IT) .......................................... TO99A0856

(51) Int. Cl.⁷ ................................................ B60Q 1/00

(52) U.S. Cl. ........................ 340/436; 340/901; 340/903

(58) Field of Search ................................. 340/435, 436, 340/438, 901, 903, 904; 359/601, 603, 841, 843, 844; 236/51, 493

(56) References Cited

U.S. PATENT DOCUMENTS

| | | | | |
|---|---|---|---|---|
| 5,691,849 A | * | 11/1997 | Ledroit et al. | 359/603 |
| 5,857,906 A | * | 1/1999 | Cho | 236/493 |
| 6,038,496 A | * | 3/2000 | Dobler et al. | 340/436 |
| 6,072,391 A | * | 6/2000 | Suzuki et al. | 340/468 |
| 6,166,848 A | * | 12/2000 | Cammenga et al. | 359/267 |
| 6,193,380 B1 | * | 2/2001 | Jacobs | 340/903 |

* cited by examiner

*Primary Examiner*—Van T Trieu
(74) *Attorney, Agent, or Firm*—Sughrue Mion, PLLC

(57) ABSTRACT

An infrared sensor device for motor-vehicles, designed to detect the presence of an overtaking vehicle, comprising at least two cells sensitive to infrared radiation, placed on one side of the reflecting plate on the outside rear view mirror of a motor-vehicle, behind focusing optics. Each cell emits a signal proportional to the infrared radiation it receives. An electronic circuit emits a global signal proportional to the difference between the signals emitted by the two cells, so that said global signal enables the presence of an overtaking vehicle to be distinguished from that of other vehicles travelling in the opposite direction, as well as avoiding false alarms due to electronic and electromagnetic noise.

10 Claims, 2 Drawing Sheets

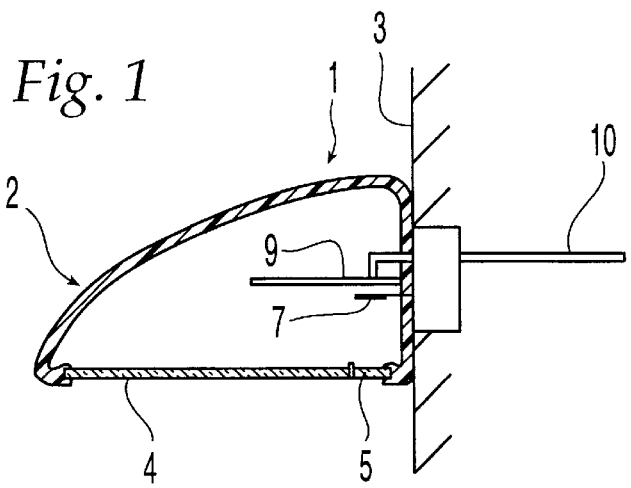
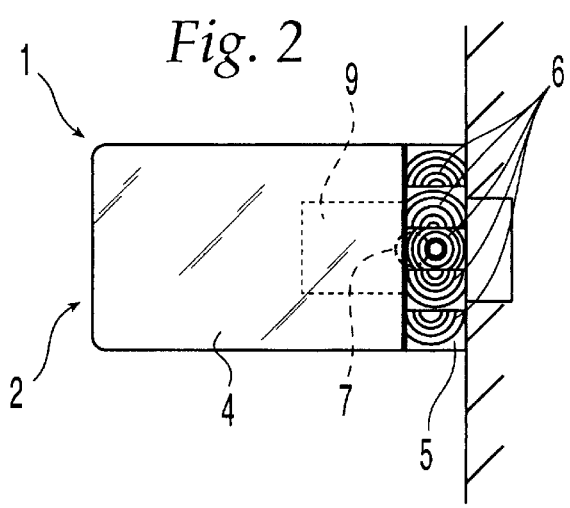
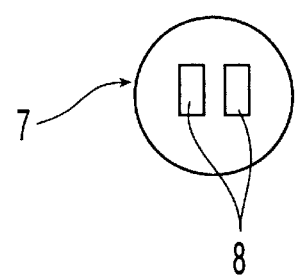
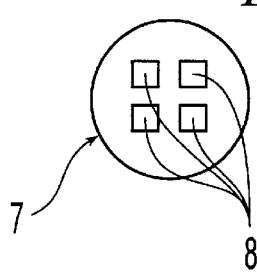
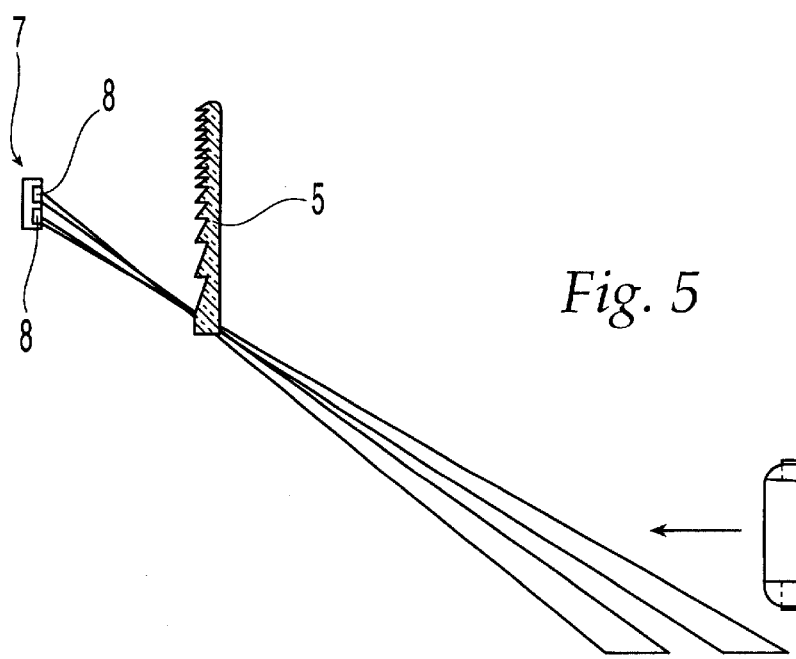

INFRARED SENSOR DEVICE FOR MOTOR-VEHICLES, ADAPTED FOR DETECTING PRESENCE OF AN OVERTAKING VEHICLE

The present invention refers to infrared sensor devices for motor-vehicles, of the type designed to detect the presence of an overtaking vehicle. In particular, the invention concerns a device of the type comprising infrared sensors associated with the rear view mirror on the outside of the motor-vehicle and suitable for detecting the infrared radiation emitted by an overtaking vehicle.

BACKGROUND OF THE INVENTION

Devices of the type described above are illustrated, for instance, in EP-A-0 673 802 and in DE-A-296 17 413. Said devices tend to reduce the potential risks deriving from the so-called "blind spot" on the outside rear view mirror, warning the driver of the presence of an overtaking vehicle that is hidden by the above-mentioned blind spot on the rear view mirror and that the driver would therefore be unaware of otherwise.

The drawbacks of devices of the kind mentioned above that have been developed to date are that their operation is unreliable, since they are incapable of distinguishing clearly between the presence of an overtaking vehicle and that of other vehicles traveling in the opposite direction to the vehicle on which the device is installed. Said known devices, moreover, are at risk of false alarms due to electronic and electromagnetic noise in the environment in which the vehicle moves.

SUMMARY OF THE INVENTION

With a view to overcoming said drawbacks, the object of the present invention is a sensor device of the type indicated at the beginning of the present description, characterized by the fact that it includes at least two cells that are sensitive to infrared radiation, placed on one side of the reflecting plate of the outside rear view mirror, behind focusing optics, in which each cell emits a signal that is proportional to the infrared radiation it receives, said device including an electronic circuit that emits a global signal proportional to the difference between the signals produced by the two cells, so that said global signal enables a distinction to be made between the presence of an overtaking vehicle and that of other vehicles travelling in the opposite direction, as well as reducing the likelihood of false alarms due to electronic and electromagnetic noise.

Preferably, the above-mentioned cells are pyroelectric sensors that emit a signal proportional to their temperature. Sensors of this type are marketed, for instance, by Heiman, Murata, Nippon Ceramic, etc.

Further advantages and characteristics of the invention will emerge from the description that follows, with reference to the attached drawings, provided merely by way of example and in no way restricting the scope of the invention, in which:

BRIEF DESCRIPTION OF THE DRAWINGS

FIG. 1 is a cross-section through a horizontal projection of an outside rear view mirror for a motor-vehicle fitted with a device made according to this invention, FIG. 2 is a front view of the rear view mirror shown in FIG. 1, FIG. 3 is an exploded view of a detail of FIG. 2, FIG. 4 illustrates a variant of FIG. 3, FIG. 5 is a schematic layout that illustrates the operating principle behind the device made according to this invention.

DETAILED DESCRIPTION OF THE INVENTION

Figure 7:
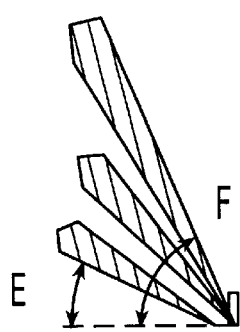
FIGS. 6 and 7 are diagrams that illustrate the angular operating range of the device made according to this invention, and FIGS. 8 and 9 re diagrams that illustrate the signal emitted by the device made according to this invention in two different operating conditions.

With reference to FIGS. 1 and 2, the numeral 1 indicates a rear view mirror assembly for a motor-vehicle, comprising a body 2 mounted on the side of the vehicle 3, or in the bottom front corner of the side window, and fitted with a reflecting plate 4. The constructional details of the mirror 1 and of the way in which said mirror is attached to the motor-vehicle are not described here because they can be achieved in any known manner and they do not form a part of the present invention.

According to this invention, on the inner side of the reflecting plate 4 there is vertically elongated plate 5 comprising a number of Fresnel lenses 6 serving to focus the infrared radiation emitted by an overtaking vehicle on a sensor 7 comprising a pair of pyroelectric cells 8, each of which is designed to emit an electric signal proportional to its temperature. FIG. 4 illustrates a variant of FIG. 3 in which four pyroelectric cells 8 are used. The sensor 7 is associated with an electronic circuit 9 which emits a global electric signal 10 that is proportional to the difference between the signals emitted by the two cells 8.

Figure 8:
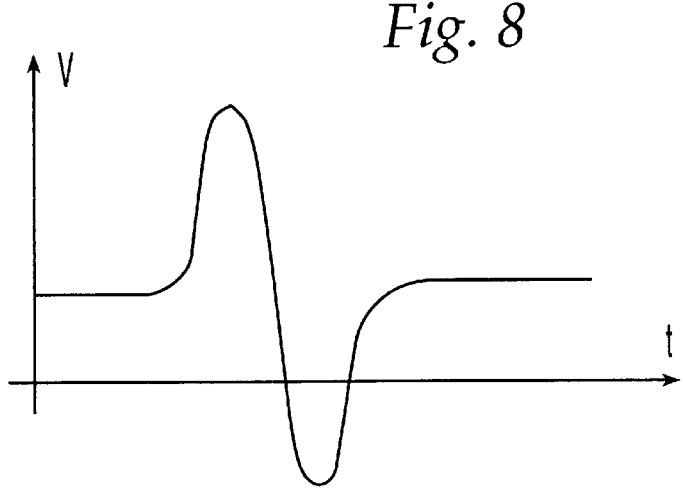

FIG. 5 schematically illustrates the focusing optics 5 and the two cells 8 forming part of the sensor 7, with the corresponding angular operating range. It is clear from the illustration that an overtaking vehicle V intercepts first the field of vision A of the outer cell 8 and then the field of vision B of the inner cell 8. The global signal emitted by the device in the case of the example illustrated in FIG. 5 is therefore of the type illustrated in FIG. 8. Said figure is a diagram of the voltage as a function of the time. As we can see, because the infrared radiation emitted by the overtaking vehicle affects the outer cell 8 first, a positive voltage impulse is emitted. As the overtaking vehicle advances, the radiation also affects the other cell 8, which first produces a negative voltage that goes to compensate the positive voltage of the outer cell and then, when the outer cell is no longer irradiated, it produces a negative voltage impulse.

Figure 9:
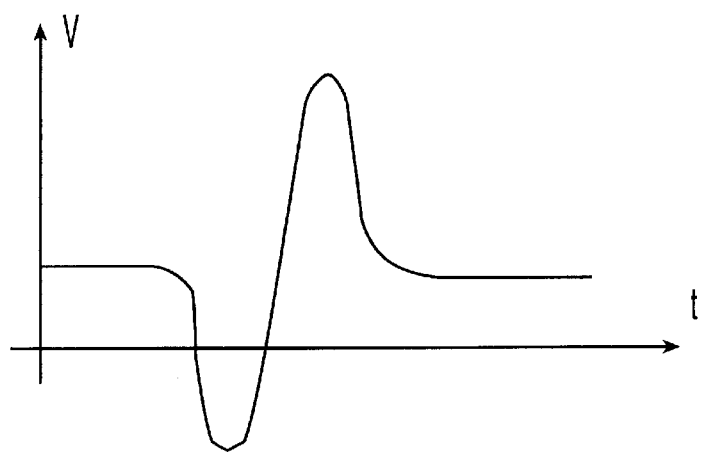

Because the vehicle on which the device is installed is also in motion, the device also detects static sources on the left-hand side of the road (pedestrians, parked vehicles or other sources of radiation) and vehicles travelling in the opposite direction. However, the device is capable of discriminating overtaking vehicles from such other sources, because the overtaking vehicle produces a signal of the kind illustrated in FIG. 8, whereas vehicles that are travelling in the opposite direction, for instance, produce a signal of the type illustrated in FIG. 9. Moreover, the signal produced by the overtaking vehicle is generally stronger because it passes closer to the device.

Figure 6:
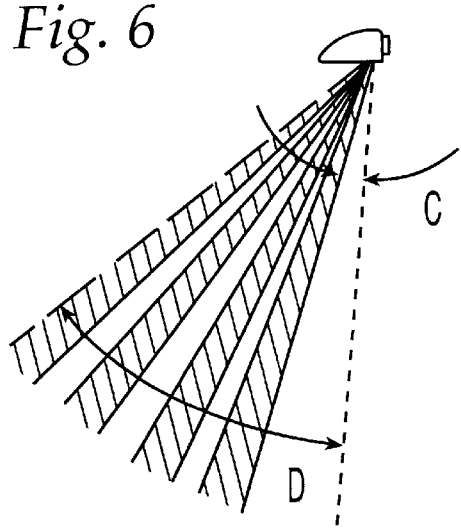

FIGS. 6 and 7 illustrate the angular operating ranges of the device in the horizontal plane and in the vertical plane. In the horizontal plane, the operating range extends between an angle C of 5–10° and an angle D of about 45°. The angular operating range in the vertical plane comes between an angle E of about 25–30° and an angle F of about 70–80°.

The coverage can also be divided into separate areas, e.g. four in the horizontal direction and three in the vertical direction, as also illustrated in FIGS. 6 and 7, in order to divide the output into several impulses on the passage of the vehicle.

The optics 5 can be protected with a diamond-type scratch-proof coating deposited at low temperatures, and can be made of high-density polyethylene (HDPE).

The output signal amplified by the electronic chain can be converted into a luminous or acoustic warning signal. The enabling of the device (or the choice of the type of signal) can be controlled by the driver by means of a switch, or it can be connected to the use of the left-hand indicator (for left-hand drive vehicles) or the right-hand indicator (for right-hand drive vehicles).

Of course, a device made according to this invention could also be made as a separate element from the rear view mirror.

In any case, without prejudice to the principle of this invention, the manufacturing details may vary considerably with respect to those described and illustrated here by way of example, without this departing from the context of the present invention.

What is claimed is:

1. Infrared sensor device for motor-vehicles, designed to detect the presence of an overtaking vehicle, including infrared sensors associated with an outside rear view mirror designed to detect the infrared radiation emitted by an overtaking vehicle, wherein the device includes at least two cells sensitive to infrared radiation, placed on one side of the reflecting plate of the rear view mirror, behind focusing optics, in which each cell emits an output signal proportional to the infrared radiation it receives, said device including an electronic circuit that emits a global output signal proportional to the difference between the signals produced by the two cells, so as to ensure that said global signal enables the presence of an overtaking vehicle to be distinguished from that of other vehicles traveling in the opposite direction, as well as reducing the likelihood of false alarms due to electronic and electromagnetic noise.

2. Sensor device according to claim 1, wherein the above-mentioned cells are pyroelectric sensors that emit an output signal proportional to their temperature.

3. Sensor device according to claim 2, wherein said sensors are pyroelectric sensors of the two-cell or four-cell type.

4. Sensor device according to claim 1, wherein said focusing optics include one or more Fresnel lens(es).

5. Sensor device according to claim 4, wherein said optics are made of high-density polyethylene (HDPE).

6. Sensor device according to claim 4, wherein said optics are protected with a scratch-proof coating, e.g. of the diamond type.

7. Sensor device according to claim 1, wherein it includes an angular operating range in the horizontal plane coming between approximately 5–10° and approximately 45°, and an angular operating range in the vertical plane coming between approximately 25–30° and approximately 70–80°.

8. Sensor device according to claim 7, wherein the angular operating range of the device in the horizontal plane and in the vertical plane is divided into a number of distinct sectors, so as to divide the output into several impulses on the passage of a vehicle.

9. Sensor device according to claim 1, wherein it is designed to come on automatically following the enabling of the motor-vehicle's direction indicator on the overtaking side.

10. Sensor device according to claim 1, wherein it can be enabled manually and it includes an acoustic and/or luminous signal.

* * * * *